Patented Oct. 17, 1922.

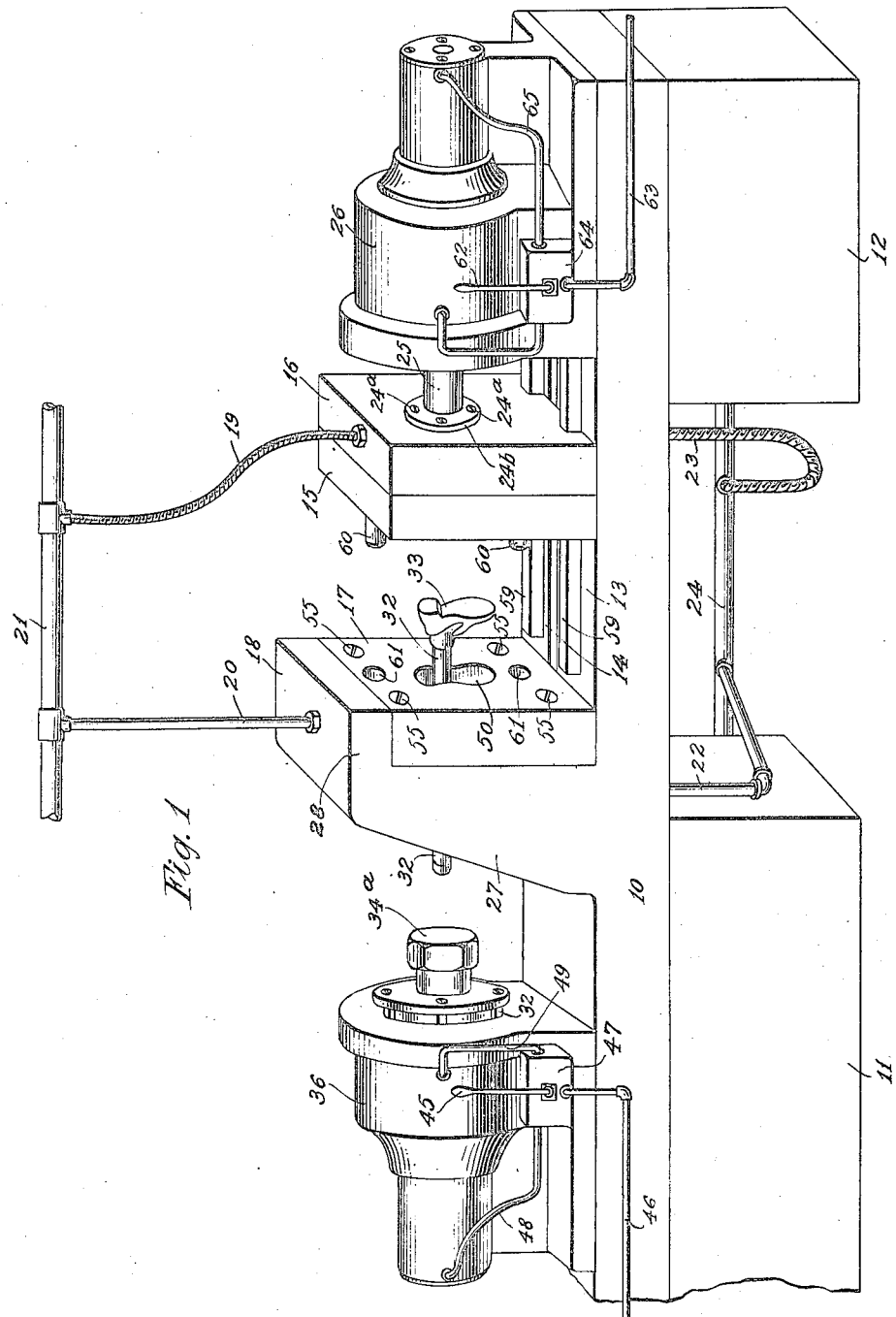

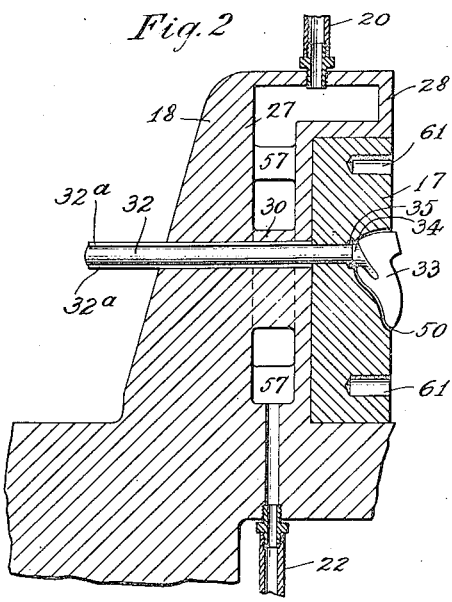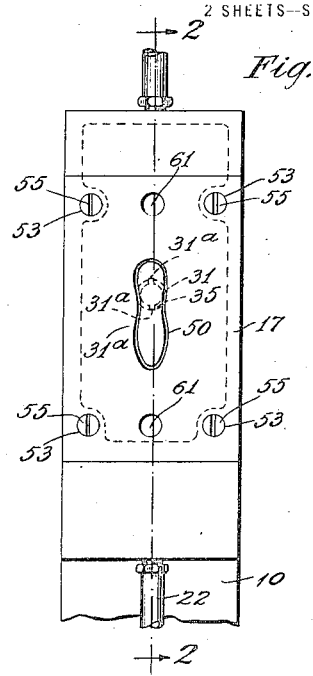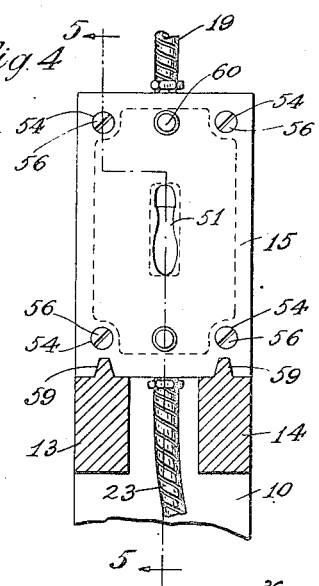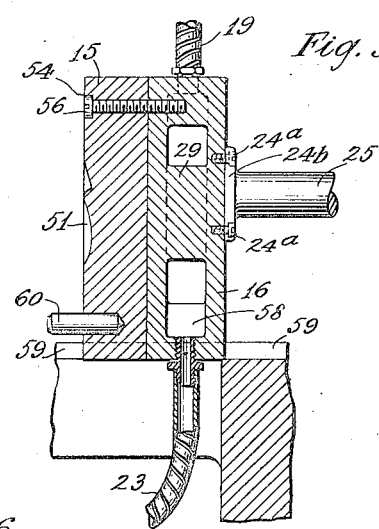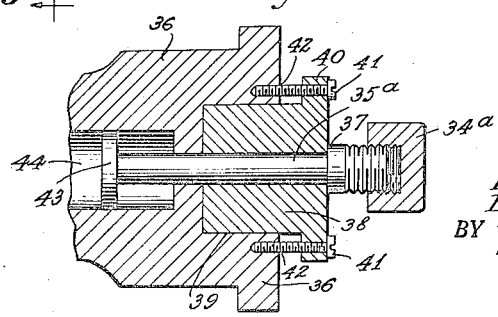

1,432,469

UNITED STATES PATENT OFFICE.

PETER J. KLEIN AND EDWARD KENNY, OF NAUGATUCK, CONNECTICUT.

PRESS AND PROCESS FOR VULCANIZING RUBBER SHOES.

Application filed January 20, 1922. Serial No. 530,536.

*To all whom it may concern:*

Be it known that we, PETER J. KLEIN, a citizen of the United States, residing in city of Naugatuck, county of New Haven, State of Connecticut, and EDWARD KENNY, a citizen of the United States, residing in city of Naugatuck, county of New Haven, State of Connecticut, have invented certain new and useful Improvements in a Press and Process for Vulcanizing Rubber Shoes, of which the following is a specification.

This invention relates to molding presses and more particularly to a molding press and a process for use in manufacturing rubber shoes.

One object of the invention is to provide a molding press of the above nature in which all the processes of shaping, molding, and vulcanizing may be accomplished by a single operation of the press.

A further object is to provide an apparatus of the above nature which will be simple, easy to manipulate, and very rapid, efficient, and durable in use.

With these and other objects in view, there has been illustrated in the accompanying drawing one form in which the invention may be conveniently embodied in practice.

Fig. 1 represents a perspective view of the molding press, with the mold-sections shown in open position.

Fig. 2 is a sectional view of the stationary mold-section, taken along the line 2—2 of Fig. 3 and showing the core-rod and last in vulcanizing position, prior to the ejecting operation.

Fig. 3 is an end view of the stationary mold-section. Fig. 4 is a similar end view of the movable mold-section, with the tracks or guides upon which it slides shown in section.

Fig. 5 is a sectional view of the movable mold-section taken along the broken line 5—5 of Fig. 4.

Fig. 6 is a sectional view of one end of the last-ejecting hydraulic press showing the hydraulic piston and the adjustable head carried thereby.

In manufacturing rubber shoes in the past, it has been customary to first prepare the rubber composition in the form of thin sheets. These sheets then had to be carefully cut according to patterns and templets into a number of sections whose dimensions were determined by the particular style and size of the shoe being manufactured. These sections of sheet material were then "formed" or "fashioned" on the last in the exact shape of the final product. The shoe was then vulcanized by being run into a chamber of live steam.

Various attempts have been made in the past to manufacture rubber shoes in molding presses, but these attempts have never proven successful. In one such method, the shoe was vulcanized in a press having two complementary mold-sections adapted to supply heat to the sides of the rubber shoe. In such presses each mold-section supplied vulcanizing heat to one-half of the "upper" and one-half of the "sole," the plane of contact of the mold-sections being perpendicular to the plane of the "sole." A shoe so manufactured was very unsightly, due to the "fin" or ridge which was always formed on the shoe between the two halves of the mold. Moreover, the former methods of manufacturing rubber shoes were slow and laborious and required the use of a needless amount of expensive equipment, such as cutting tool, templets, and patterns.

According to the present invention, the above and other disadvantages are largely avoided. This is accomplished by providing a press in which the processes of shaping, forming, molding, and vulcanizing are all carried out by a single operation of the press. This is made possible by the use of a special form of mold having mold-sections whose plane of contact is parallel to the "sole" and at the junction between the "upper" and the "sole" of the shoe. In other words, one mold-section has a cavity accurately fitted to the "upper" of the shoe, while the other mold-section has a cavity fitted to the "sole" of the shoe. The core of the mold, herein termed the "last," is fitted to the inner surface of the rubber shoe.

In operating the press in accordance with this invention small pieces of rubber composition are placed upon the top and bottom of the last, and when the mold is closed, the plasticity of the rubber composition will permit it to flow under pressure into all parts of the mold and be vulcanized. It will thus be seen that the cutting and "fashioning" processes formerly required, are no longer essential.

Referring now to the drawings in which like reference numerals denote corresponding parts throughout the several views, the frame 10 of the apparatus is supported upon the base sections 11 and 12, and is provided with tracks 13 and 14. These tracks permit the movable mold 15, with its support 16, to slide toward and away from the stationary mold 17, the latter being held securely in place by the up-standing support 18 formed integral with the frame 10.

The mold-sections 15 and 17 are heated by hollow mold-supports 16 and 18, the faces of which are in direct contact with the backs of said mold-sections. Steam is supplied to the hollow supports 16 and 18 from the pipes 19 and 20 which are coupled to the tops of said supports in the manner most clearly shown in Figs. 2 and 5. These pipes 19 and 20 receive live steam under pressure from the common steam pipe 21, so that the temperature upon the two sides of the mold will be identical, thereby insuring proper even vulcanization.

After delivering its heat to the mold supports 16 and 18, the steam exhausts at the bottom through the pipes 22 and 23, and is withdrawn through the common exhaust pipe 24. The pipes 19 and 23 are preferably made from flexible material such as metal hose or the like to prevent interference with the free sliding of the movable mold-support. The pipes 20 and 22, however, which are connected to the stationary mold-support, are preferably made rigid, as shown.

The movable support 16 is secured at its rear face by screws 24$^a$ to the flange 24$^b$ of the piston-rod 25 of the mold-closing hydraulic press 26. The stationary mold-support 18 is preferably made in the form of an inverted L having a vertical portion 27 and a top horizontal portion 28 in order to more efficiently heat the mold-section 17. In order to strengthen the steam chests in the hollow supports 16 and 18, central pillars 29 and 30 may be provided, said pillars preferably being integral with said supports. These pillars are located in line with the axis of the hydraulic piston 25 and hence transmit the direct thrust from said piston. By the use of such pillars the walls of the hollow supports may be made relatively thin without danger of being crushed in by the large hydraulic stresses to which they may be subjected.

The stationary mold-support 18 is provided with a cylindrical bearing 31 extending longitudinally through the pillar 30 of the support 18 and having keyways 31$^a$. A cylindrical core-rod 32, provided with upper and lower keys 32$^a$ which fit into the keyways 31$^a$, is mounted within said bearing 31. The core or "last" 33, rigidly mounted on the inner end of the core-rod 32, is shaped according to the size and style of the rubber shoe to be molded. The core-rod 32 at the point where it adjoins the last 33, is provided with an enlarged shoulder-section 34 which is slidably fitted within the cylindrical bearing-portion 35 in the back of the mold cavity in the mold-section 17. The enlarged shoulder-section 34 is preferably spaced slightly from the rear of the bearing-portion 35, so that the thrust exerted upon the last by the pressure in the mold will be transmitted through the core-rod 32 to the adjustable nut 34$^a$. The nut 34$^a$ is screwed upon the end of the threaded piston-rod or plunger 35$^a$ of the last-ejecting hydraulic press 36. To prevent possibility of stripping of the threads on the nut 34$^a$ and plunger 35$^a$, these threads are preferably made of large pitch.

As will be evident, the nut 34$^a$ may be quickly and accurately adjusted along the plunger 35$^a$, and since the core-rod 32 abuts against the nut 34$^a$, the relative thickness of the "upper" and the "sole" may be thus varied as desired. The plunger 35$^a$ is provided with a shoulder 37 which is adapted to abut against the closure block 38, the latter being fitted within a cylindrical opening 39 in the end of the hydraulic press 36. In order to hold the closure 38 in position an annular flange 40, integrally formed thereon, may be provided with a series of equally spaced apertures—four in this instance. A corresponding number of tightening set-screws 41 are adapted to engage in said apertures and to be screwed into screw-holes 42 in the hydraulic press 36.

The inner end of the plunger 35$^a$ is provided with a piston-head 43 adapted to reciprocate in a pressure chamber 44. This piston head 43 is subject to be pushed outwardly by the pressure of the water in said chamber when admitted to the left of the piston head 43. When it is desired to force the core-rod out of the stationary mold-section, after the vulcanization has been completed, the operating handle 45 will be rocked to the left of the position shown in Fig. 1. Water from the main 46 will then flow into the control box 47 and be diverted through the pipe 48 to the left-hand side of the piston head 43, causing the last to be ejected.

When the last has been ejected from the stationary mold-section by the operation just described, the plunger 35$^a$ may be returned to its original position by rocking the control handle 45 to the right, and thus sending the water through the control box 47 and the pipe 49 to the right-hand side of the piston head 43. The stationary mold-section 17 is provided with a cavity 50 for shaping the "upper," and the movable mold-section 15 has a cavity 51 to shape the "sole." The "last" 33 determines the shape of the inner surface of the shoe.

In order to detachably secure the stationary and movable mold-sections to their respective supports, the molds are preferably provided with a set of four screw holes 53 and 54 adapted to receive screw-bolts 55 and 56 respectively. These screw-bolts 55 and 56 extend entirely through the respective mold-sections and engage screw threads located in the pillars 57 and 58 passing through the steam chambers of the mold-supports as clearly shown in Figs. 2 and 5.

In order to accurately guide the movable mold-section 15 toward and away from the stationary mold, the movable mold-section, together with its support 16, are recessed or grooved on their under-sides. These recesses are adapted to fit the up-standing ribs 59 formed in the top of the spaced tracks 13 and 14. As clearly shown in Fig. 4, the ribs 59 may have inclined side edges and horizontal top portions in order to provide the most efficient bearing surface. In order that the movable mold-section 15 will slide accurately into the stationary mold-section 17, properly shaping the rubber shoe, a pair of vertically spaced dowel pins 60 are provided on the movable mold-section 15 and are adapted to slide into a corresponding pair of dowel pin holes 61, formed in the stationary mold-section 17.

The control system of the hydraulic press 26 is similar to that of the hydraulic press 36. Thus, the mold may be closed by moving a handle 62 to the right. Water from the main 63 will then flow through a control box 64 and a pipe 65 into a pressure chamber 44 at the right of the piston-head contained therein.

After vulcanization has been completed, the operator opens the mold by turning the control lever 62 to the left, which causes the movable mold-section 15 to slide to the right. The handle 45 at the opposite end of the apparatus is then rocked to the left for causing the ejection of the "last" 33 from the stationary mold 17. The rubber shoe may be stripped from the last immediately after it has been ejected from the mold, or if desired, it may be cooled for a suitable period of time before stripping.

In operating the vulcanizing press, the fabric lining of the shoe is first wrapped about the "upper" portion of the "last." If desired, the lining may be secured firmly in position on the last by means of clips or other fasteners, so that it will not become disarranged during the molding operation. The inner sole is next placed upon the bottom of the last. A sufficient amount of unshaped rubber composition is then placed loosely over the lining, and upon the inner sole. The composition should preferably be in the form of thin sheets or strips, and a slight excess should preferably be employed so that the mold space will be entirely filled. The mold is next closed by operating the handle 62 in the manner described above.

During the vulcanization which now takes place, the plastic rubber composition will be pressed into contact with all portions of the mold cavities 50 and 51 and the "last" 33 and will adhere tightly to the fabric lining and the inner sole. The excess of composition will be squeezed out between the edges of the mold faces and will form a "fin" at the line between the "upper" and the "sole" of the shoe. This "fin" of scrap rubber may be readily trimmed off after the shoe has been removed from the press. The degree of temperature and the length of time to secure proper vulcanization, without over-curing or under-curing the rubber, are matters which can be determined only by practice.

After one completed rubber shoe has been removed from the press, the operator, without loss of time, places a new lining, a new inner sole and the required amount of new composition upon the last, and repeats the process described above. An important feature of the invention is the great ease with which the relative thickness of the "upper" and the "sole" of the shoe may be varied—i. e., by merely adjusting the nut 34ª upon the plunger 35ª. Another important feature is the great saving of expense due to the fact that the time and labor formerly required to sheet the rubber and to cut and "fashion" the sheets into proper patterns is entirely eliminated.

In practice it will be found most convenient to operate a series of molding presses in a battery. The removal of the molded shoes and the recharging of one press may be accomplished by the operator during the time that the shoes in the other presses are undergoing vulcanization.

While there has been disclosed in this specification, one form in which the invention may be embodied, it is to be understood that this form is shown for the purpose of illustration only, and that the invention is not to be limited to the specific form disclosed, but may be modified and embodied in various other forms without departing from its spirit. In short, the invention includes all the modifications and embodiments coming within the scope of the following claims.

Having thus fully described the invention, what is claimed as new, and for which it is desired to secure Letters Patent is:

1. In an apparatus for manufacturing rubber shoes, a pair of steam-heated mold-sections, having cavities therein to shape the exterior surface of the "upper" and the "sole" of the shoe respectively, a core located in said mold, means for opening and closing said mold, and means for ejecting the core from said mold.

2. In an apparatus for manufacturing rubber shoes, a pair of mold-sections formed to shape the "upper" and the "sole" of the shoe respectively, one of said mold-sections having a core-rod slidably fitted therein, a last core fixed at one end of said core-rod, and means acting on the other end of said core-rod for ejecting the core from said mold-section.

3. In an apparatus for manufacturing rubber shoes, a pair of complementary mold-sections adapted to shape the "upper" and the "sole" of the shoe respectively, a last-core located within said mold and mounted on a rod slidable within one of said mold-sections, hydraulic means for opening and closing said mold, and means for ejecting the core from said mold.

4. In a vulcanizing press for rubber shoes, a stationary mold-section, a support therefor having a steam cavity for heating said mold-section, a core-rod slidable within said stationary mold-section and support, a core on one end of said core-rod, a movable mold-section, a movable mold-support therefor, having a steam cavity for heating said movable mold-section, said movable mold-support being connected with the piston-rod of a hydraulic press, whereby it may be slid toward and away from said stationary mold-section, and a separate hydraulic press having a piston-rod adapted to act upon the end of said core-rod to eject the core from the mold.

5. In a vulcanizing press for manufacturing rubber shoes, the combination with a stationary mold-section, of a last-core, a slidable mold-section, and hydraulic means for moving said slidable mold-section toward and away from said stationary mold-section.

6. In a vulcanizing press for manufacturing rubber shoes, the combination with a stationary mold-section, of a last-core, a slidable mold-section, a slidable support for said slidable mold-section, a hydraulic piston connected to said slidable support, and means for exerting hydraulic pressure upon opposite sides of said piston for reciprocating said slidable mold-section.

7. In a vulcanizing press for manufacturing rubber shoes, the combination with a stationary mold-section, of a slidable mold-section, a hydraulic piston connected to said slidable mold-section, a support for said slidable mold-section, means for exerting hydraulic pressure upon opposite sides of said piston for moving said slidable mold-section to and fro, a core-rod having a last-core fixed on one end, said core-rod being slidable within said stationary mold-section, a second hydraulic piston, and means for exerting pressure upon said piston for forcing said core-rod to eject the last-core from said stationary mold-section.

8. In a vulcanizing press for manufacturing a rubber shoe, a pair of co-operating complementary mold-sections for shaping the "upper" and the "sole" of the shoe respectively, a last-core for shaping the interior surface of the shoe, hydraulic means for opening and closing said mold, and hydraulic means for ejecting the core from the mold.

9. In a press for shaping, molding and vulcanizing a rubber shoe, a pair of vertical mold-sections, means for heating said mold-sections to vulcanizing temperature, means for sliding one of said mold-sections away from the other when the vulcanization is completed, a last-core for said rubber shoe, means for adjusting the position of said core within the mold to vary the relative thickness of the "upper" and the "sole."

10. In a vulcanizing press for manufacturing a rubber shoe, a stationary mold-section formed to shape the "upper" of the shoe, a slidable mold-section formed to shape the "sole" of the shoe, a core-rod extending through said stationary mold-section and having a last-core fixed on one end thereof, and an adjustable stop for the other end of said core-rod, whereby the position of the last-core in the mold may be accurately adjusted.

11. In a vulcanizing press for rubber shoes, a pair of co-operating complementary mold-sections, a core, a core-rod connected to said core and slidable within one of said mold-sections, a hydraulic press, a piston-rod in said hydraulic press having a shouldered and threaded end, a screw-cap or head mounted on the end of said piston-rod, whereby the position of the core between the mold-sections may be accurately adjusted, and means for exerting hydraulic pressure upon the piston for ejecting the core from the mold.

12. The process of manufacturing a rubber shoe, which comprises placing an upper lining and an insole upon a last, applying to said upper lining and insole a quantity of unsheathed rubber composition and then molding, shaping and vulcanizing said composition upon the upper lining and insole by subjecting said upper lining, insole and composition to the action of heat and pressure.

In testimony whereof, we have affixed our signatures to this specification.

PETER J. KLEIN.
EDWARD KENNY.

Certificate of Correction.

It is hereby certified that in Letters Patent No. 1,432,469, granted October 17, 1922, upon the application of Peter J. Klein and Edward Kenny, of Naugatuck, Connecticut, for an improvement in "Presses and Processes for Vulcanizing Rubber Shoes," an error appears in the printed specification requiring correction as follows: Page 4, line 109, claim 12, for the word "unsheathed" read *unsheeted;* and that the said Letters Patent should be read with this correction therein that the same may conform to the record of the case in the Patent Office.

Signed and sealed this 12th day of December, A. D., 1922.

[SEAL.]

KARL FENNING,
*Acting Commissioner of Patents.*